US006885930B2

(12) United States Patent
Wang

(10) Patent No.: US 6,885,930 B2
(45) Date of Patent: Apr. 26, 2005

(54) SYSTEM AND METHOD FOR SLIP SLIDE CONTROL

(75) Inventor: Xiaobin Wang, Alpharetta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/841,720

(22) Filed: May 7, 2004

(65) Prior Publication Data

US 2005/0027425 A1 Feb. 3, 2005

Related U.S. Application Data

(60) Provisional application No. 60/491,649, filed on Jul. 31, 2003.

(51) Int. Cl.[7] ................................................ G06F 13/00

(52) U.S. Cl. ............................ 701/70; 701/36; 701/50; 701/82; 477/2; 477/7; 318/52

(58) Field of Search ............................ 701/36, 41, 69, 701/70, 82, 84, 90; 318/52, 53, 59; 477/2, 3, 7; 180/65.1–65.8, 170–179, 197

(56) References Cited

U.S. PATENT DOCUMENTS

| | | | | |
|---|---|---|---|---|
| 4,674,049 A | | 6/1987 | Kubo | |
| 4,964,047 A | | 10/1990 | Matsuda | |
| 5,003,481 A | | 3/1991 | Matsuda | |
| 5,289,093 A | * | 2/1994 | Jobard | 318/434 |
| 5,351,775 A | | 10/1994 | Johnston | |
| 5,417,298 A | * | 5/1995 | Shibahata | 180/76 |
| 5,485,885 A | | 1/1996 | Matsushita | |
| 5,983,149 A | | 11/1999 | Tate | |
| 6,150,780 A | | 11/2000 | Young | |
| 6,249,733 B1 | | 6/2001 | Smith | |
| 6,299,263 B1 | | 10/2001 | Uematsu | |
| 6,526,344 B1 | * | 2/2003 | Tamura et al. | 701/70 |
| 2002/0175009 A1 | | 11/2002 | Kress | |
| 2003/0173133 A1 | | 9/2003 | Kempt | |

* cited by examiner

*Primary Examiner*—Richard M. Camby

(57) ABSTRACT

Certain exemplary embodiments comprise a method comprising: receiving a measurement of a vehicle speed; receiving information indicative of a drive speed; comparing a value related to the measurement of the vehicle speed with the information indicative of the drive speed to obtain a first speed deviation metric; and controlling a torque output of the drive within a limited range, the limited range at least partially based upon the first speed deviation metric.

23 Claims, 3 Drawing Sheets

2000
Determine Vehicle Speed Measurement 2100
Determine Actual Drive Speeds 2200
Detect and/or Determine Turn Sharpness 2300
Receive Vehicle Speed Measurement 2400
Receive Actual Drive Speeds 2500
Receive Turn Sharpness 2600
Calculate Expected Drive Speed From Vehicle Speed Measurement 2700
Correct Vehicle and/or Drive Speed For Turn Sharpness 2800
Compare Expected Drive Speed to Actual Drive Speed 2850
Control Drive Speed 2900
Control Drive Torque 2950

SYSTEM AND METHOD FOR SLIP SLIDE CONTROL

CROSS-REFERENCES TO RELATED APPLICATIONS

This application claims priority to, and incorporates by reference herein in its entirety, pending U.S. Provisional Patent Application Ser. No. 60/491,649, filed 31 Jul. 2003.

BACKGROUND

U.S. Pat. No. 4,674,049 (Kubo), which is incorporated by reference herein in its entirety, allegedly cites an "anti-skid brake control system for an automotive vehicle has a control module comprising one or more microcomputers. The microcomputer is connected to a wheel speed sensor, which supplies a sensor signal indicative of the wheel speed, and a timer which outputs a timer signal indicative of the elapsed time. The microcomputer has an input time data sampling program for latching the timer signal value and storing the latched timer signal value as input time data for the corresponding sensor signal pulse. The input time data sampling program is executed as an interrupt program independent of a main program which processes the input time data and controls application and release of hydraulic braking pressure to a vehicle wheel in such a manner that wheel speed is adjusted toward an optimum relationship with vehicle speed. The microcomputer is also provided with a flag register which is incremented everytime the main program is interrupted for execution of the input time data sampling program and decremented at the end of each cycle of execution of the main program. The microcomputer repeatedly executes the main program until the register value of the flag register becomes equal to zero." See Abstract.

U.S. Pat. No. 4,964,047 (Matsuda), which is incorporated by reference herein in its entirety, allegedly cites an "anti-skid brake control system employs a technique for correcting a longitudinally based vehicular speed variation gradient by a road slop dependent correction value. The road slop dependent correction value is derived on the basis of an assumed road slop condition which is assumed on the basis of magnitude of increase of the braking pressure." See Abstract.

SUMMARY

Certain exemplary embodiments comprise a method comprising: receiving a measurement of a vehicle speed; receiving information indicative of a drive speed; comparing a value related to the measurement of the vehicle speed with the information indicative of the drive speed to obtain a first speed deviation metric; and controlling a torque output of the drive within a limited range, the limited range at least partially based upon the first speed deviation metric.

BRIEF DESCRIPTION OF THE DRAWINGS

A wide variety of potential embodiments will be more readily understood through the following detailed description, with reference to the accompanying drawings in which.

DEFINITIONS

Figure 1:
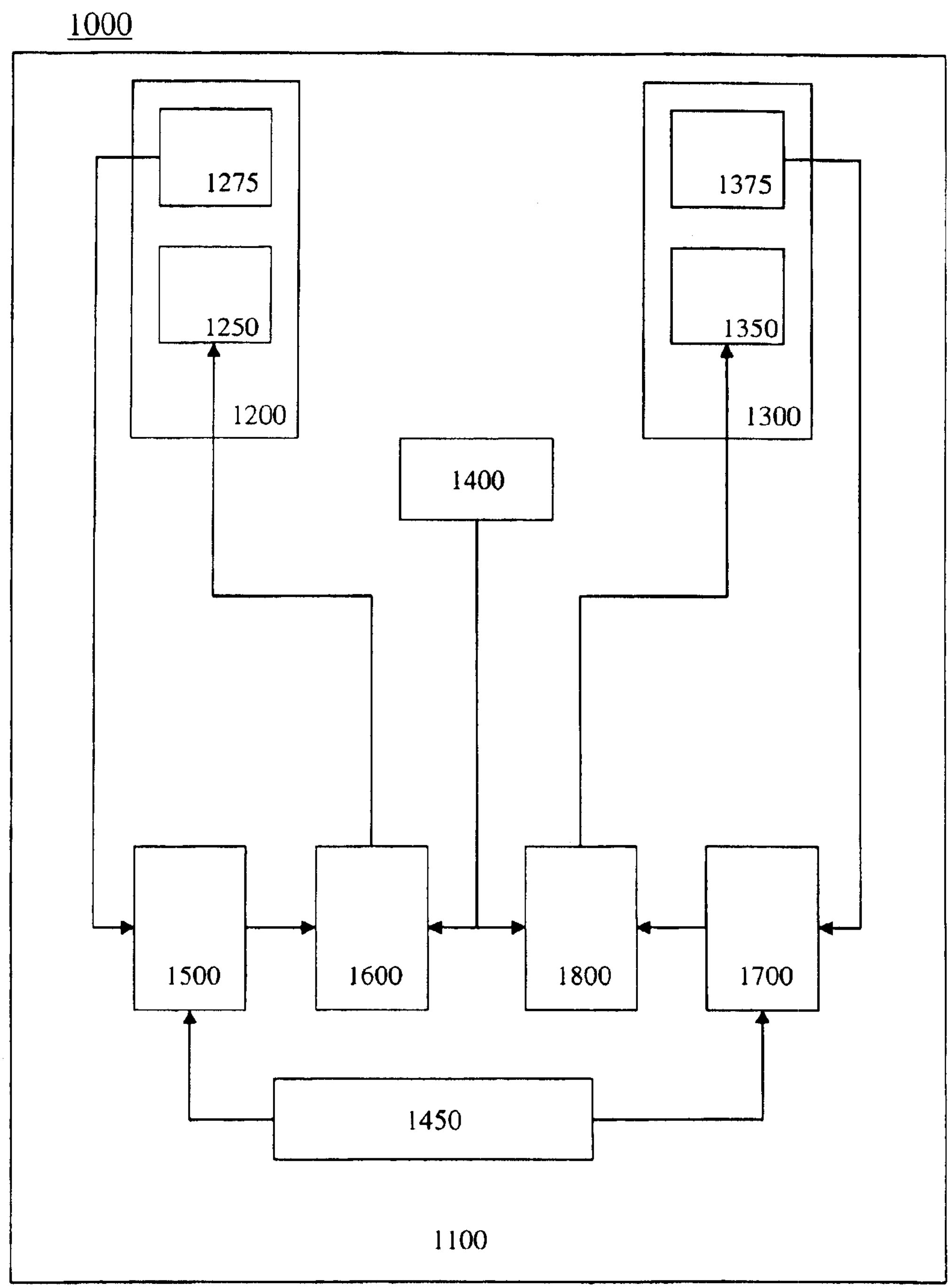
FIG. 1 is a block diagram of an exemplary embodiment of a slip-slide control system 1000.

When the following terms are used herein, the accompanying definitions apply:

actual—based in reality. An actual value can be estimated via measurement.

comparator—a device adapted to compare a measured property of an object with a standard and/or another measured property of the object.

controller—a device for processing machine-readable instruction. A controller can be a central processing unit, a local controller, a remote controller, parallel controllers, and/or distributed controllers, etc. The controller can be a general-purpose microcontroller, such the Pentium III series of microcontrollers manufactured by the Intel Corporation of Santa Clara, Calif. In another embodiment, the controller can be an Application Specific Integrated Circuit (ASIC) or a Field Programmable Gate Array (FPGA) that has been designed to implement in its hardware and/or firmware at least a part of an embodiment disclosed herein.

correct—adjust in value.

Doppler effect—a change in an observed frequency of a wave, as of sound or light, occurring when the source and observer are in motion relative to each other.

drive—a means by which power is transmitted to the wheels of a vehicle.

electric motor—a motor powered by electricity. An electric motor can comprise two wound members, one stationary, called the stator, and the other rotating, called the rotor.

forward direction—a course advancing an object.

information—data.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

I/O device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected limited range—a constrained extent of values.

measurement—a dimension, quantification, and/or capacity, etc. determined by observation.

mine haul truck—a motor vehicle adapted to haul ore extracted from the earth.

motor—something that produces or imparts motion.

reversing directions—switching from a clockwise to a counterclockwise rotation, or vice versa.

rotational direction—a course upon which an object turns around a center or an axis. A rotational direction can be expressed as being, for example, clockwise or counterclockwise relative to a frame of reference.

rotational speed—a velocity at which an object turns around a center or an axis. A rotational speed can be expressed in terms of a number of revolutions in a given time period.

sharpness—acuteness.

slip—lose traction.

speed—a transverse or rotational velocity.

steering encoder—a device adapted to detect, store, and/or transmit the sharpness of a vehicular turn.

tachometer—an instrument used to measure the rotations per unit time period of a rotating shaft truck—a motor vehicle designed for carrying or pulling a load.

turn—to change the position of by traversing an arc.

value—a definable quantity.

velocimeter—a device adapted to measure a traversing speed.

vehicle—a device or structure for transporting persons or things. A vehicle can be a car, truck, locomotive, and/or mine haul truck, etc.

wheel—a solid disk or a rigid circular ring connected by spokes to a hub, designed to turn around an axle passed through the center.

DETAILED DESCRIPTION

FIG. 1 is a block diagram of an exemplary embodiment of a slip-slide control system 1000. Certain exemplary embodiments can comprise a vehicle 1100. Vehicle 1100 can be an automobile, a pick-up truck, a tandem wheel truck, and/or a mine haul truck, etc.

Vehicle 1100 can comprise a first wheel drive 1200 and a second wheel drive 1300. In certain exemplary embodiments, first wheel drive 1200 can comprise a first motor 1250. Second wheel drive 1300 can comprise a second motor 1350. In certain exemplary embodiments, first wheel drive 1200 and second wheel drive 1300 can be driven by a single electric or fossil fuel powered engine. First wheel drive 1200 can be controllably rotatable at a first drive speed. Second wheel drive 1300 can be controllably rotatable at a second drive speed. The first drive speed can be distinct and/or different from the second drive speed. In certain exemplary embodiments, the first drive speed and/or the second drive speed a can be controllable via a pneumatic or hydraulic braking system.

First motor 1250, second motor 1350 can be alternating current (AC) electric induction motors, direct current (DC) electric motors, and/or hydraulically powered motors, etc. The speed of first motor 1250 and/or second motor 1350 can be controlled via an ac inverter frequency controller, a silicon controlled rectifier speed control circuit, and/or a variable speed hydraulic motor, etc. In certain exemplary embodiments, first wheel drive 1200 and second wheel drive 1300 can be driven by a single motor. The first drive speed and/or the second drive speed can be controllable via a braking system.

First drive 1200 and/or second drive 1300 can comprise tachometers such as a tachometer 1275 and a tachometer 1375. Tachometer 1275 and/or tachometer 1375 can be adapted to provide a rotational frequency of a particular shaft associated with first drive 1200 and/or second drive 1300. Tachometer 1275 and tachometer 1375 can, for example, be adapted to directly or indirectly determine an actual first drive speed and/or an actual second drive speed. Tachometer 1275 and/or tachometer 1375 can be direct contact tachometers using, for example, magnetic brushes to provide a signal indicative of rotational speed. Tachometer 1275 and/or tachometer 1375 can be indirect contact tachometers adapted to sense an optical signal reflected off a surface.

Vehicle 1100 can comprise a velocimeter 1400 adapted to measure an actual speed of vehicle 11100 relative to the earth. In certain exemplary embodiments, velocimeter 1400 can utilize Doppler effect shifts of optical and/or acoustic waves to determine the actual speed of vehicle 1100. In certain exemplary embodiments velocimeter 1400 can utilize a triangulation technique using signals from a plurality of reference points to measure an actual speed of vehicle 1100 relative to the earth. The measured actual speed of vehicle 1100 can be utilized to estimate an expected first drive speed and/or an expected second drive speed.

Vehicle 1100 can comprise a steering encoder 1450. Steering encoder 1450 can be adapted to detect, determine, receive, and/or transmit a value indicative of a turn sharpness associated with vehicle 1100. The turn sharpness can be used to correct an actual vehicle speed measured by velocimeter 1400, the actual first drive speed, and/or the actual second drive speed, etc.

Vehicle 1100 can comprise a first comparator 1500 and a second comparator 1700. Comparator 1500 can be adapted to compare the actual first drive speed with the expected first drive speed. Comparator 1700 can be adapted to compare the actual second drive speed with the expected second drive speed. In certain exemplary embodiments, a single physical device can comprise comparator 1500 and comparator 1700.

Vehicle 1100 can comprise a first controller 1600 and a second controller 1800. Controller 1600 can be adapted to control the actual first drive speed within a limited range. Controller 1800 can be adapted to control the actual second drive speed within a limited range. In certain exemplary embodiments, controller 1600 can be adapted to control the actual torque of first wheel drive 1200 within a limited range. Controller 1800 can be adapted to control the actual torque of second wheel drive 1300 within a limited range. In certain exemplary embodiments, a single physical device can comprise controller 1600 and controller 1800. In certain exemplary embodiments, controller 1600 can be adapted to control the actual first drive speed within a range of, for example, approximately 60% and approximately 100% of the expected first drive speed. Likewise, in certain exemplary embodiments, controller 1800 can be adapted to control the actual second wheel drive speed within a range of, for example, approximately 60% and approximately 100% of the expected second drive speed.

Controller 1600 and/or controller 1800 can be adapted to prevent first wheel drive 1200 from turning in a rotational direction counter to second wheel drive 1300. Preventing first wheel drive 1200 from turning in the rotational direction counter second wheel drive 1300 can improve the operational life of at least one mechanical component of first wheel drive 1200 and/or second wheel drive 1300 such as, for example, a differential of vehicle 1100. The differential of vehicle 11100 can be adapted to allow the first drive speed to be distinct and/or different from the second drive speed.

Figure 2:
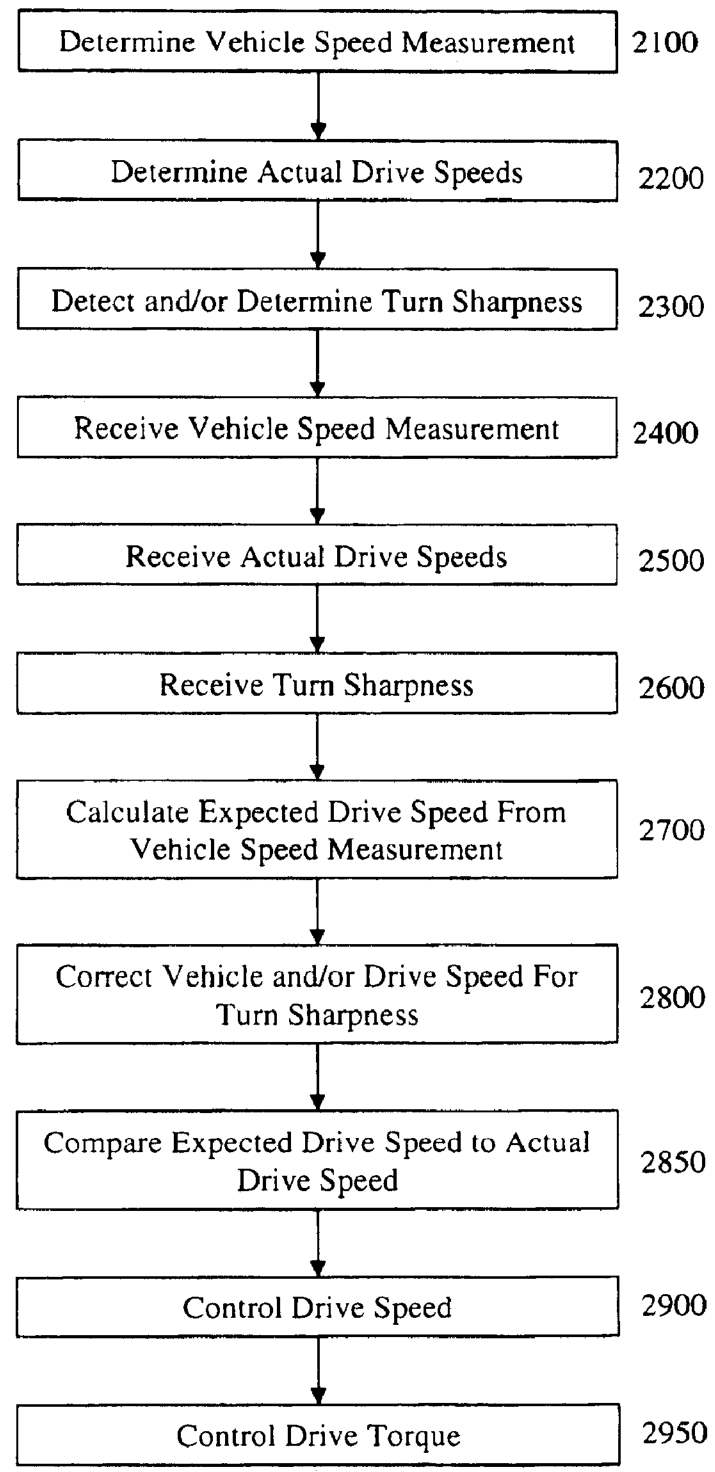
FIG. 2 is a flow diagram of an exemplary embodiment of a slip-slide control method 2000.

FIG. 2 is a flow diagram of an exemplary embodiment of a slip-slide control method 2000, which can be used for improving vehicular performance and/or reliability. At activity 2100, a determination can be made of a measurement of an actual speed of a vehicle. The measurement can utilize what is known as the Doppler effect and/or Doppler shift. In certain exemplary embodiments, the Doppler shift detected by a Doppler transceiver can be standardized and/or calibrated to a particular constant, such as 100 Hz per mile per hour (MPH) of vehicle speed. The Doppler shift of the reflected Doppler transmission signal can be proportional to the change in distance over time between the point at which the Doppler transmission signal was directed and the Doppler transceiver.

An offset angle can be defined between the direction of the Doppler transmission signal and the direction of travel of the vehicle. In certain exemplary embodiments, the speed of the vehicle in its direction of travel can be calculated by multiplying a value proportional to the Doppler frequency shift by a cosine of the offset angle. Multiplying the value proportional to the Doppler frequency shift by the cosine of the offset angle can provide, for the velocity vector detected by the Doppler shift, the component of that velocity vector that is aligned with the direction of travel of the vehicle.

In certain exemplary embodiments, for example, the speed of a vehicle can be calculated as: actual speed=Doppler shift/(100 Hz/MPH)/cos (offset angle). In certain exemplary embodiments, for example, the speed of a vehicle can be calculated as: actual speed=Doppler shift/cos (offset angle)/(100 Hz/MPH). In an exemplary embodiment with a 30 degree offset angle and a measured Doppler shift of 1732 Hz:

$$\text{Actual speed}=1732/(100\ \text{Hz/MPH})/\cos(30)=20\ \text{MPH}$$

The Doppler signal can be reflected off, for example, a road surface, a mine wall face, and/or a ground surface adjacent to the road surface, etc. A reflected Doppler signal can be detected and the detected information can be processed. The detected information can be processed to filter signals reflected off unintended surfaces, noise, interference, harmonics, etc.

The vehicle can comprise a first wheel drive and a second wheel drive. The first wheel drive can comprise a first electric motor. The first wheel drive can be controllably rotatable at a first drive speed. The vehicle can comprise a second wheel drive. The second wheel drive can comprise a second electric motor. The second motor can be distinct from the first motor. The second wheel drive can be controllably rotatable at a second drive speed. The second drive speed can be distinct from the first drive speed.

At activity 2200, actual drive speeds can be determined. The actual drive speeds can comprise an actual first drive speed associated with the first wheel drive and/or an actual second drive speed associated with the second wheel drive. The actual drive speeds can be determined, for example, via at least one tachometer.

At activity 2300, a turn sharpness can be detected and/or determined. The turn sharpness can be indicative of a degree of acuteness at which the vehicle is changing directions. The turn sharpness can be detected, determined, and/or transmitted via a steering encoder.

At activity 2400, the measurement of the actual vehicle speed can be received. Receiving the measurement of the actual vehicle speed can allow an information device to calculate, compare, and/or control values to assist in controlling vehicular wheel slippage and sliding conditions.

At activity 2500, information indicative of the actual first drive speed and the actual second drive speed can be received. The information indicative of the actual first drive speed and the actual second drive speed can be received directly from a speed sensing device and/or via transmission from an information device.

At activity 2600, the turn sharpness can be received. The turn sharpness can be received, for example, from the steering encoder. Turn sharpness can be expressed, for example, as a percentage wherein a vehicle bearing in a forward direction and not turning can be expressed as 50% on a 0 to 100% scale. Maximum left turn sharpness can be expressed as 0%. Maximum right turn sharpness can be expressed as 100%. Alternatively, maximum right turn sharpness can be expressed as 0%, and maximum left turn sharpness can be expressed as 100%. Alternatively, any other scale can be utilized.

At activity 2700, expected drive speeds can be determined. For example, an expected first drive speed associated with the first drive can be determined. An expected second drive speed associated with the second drive can be determined. The expected drive speeds can be calculated using the measurement of the actual speed of the vehicle. The expected drive speeds can be calculated using wheel circumference via a determination indicating the number of wheel revolutions approximating the measured actual speed of the vehicle.

At activity 2800, the vehicle and/or drive speeds can be corrected for turn sharpness For example, exemplary multiplicative factors for correcting the measurement of the actual speed of the vehicle are shown in Table 1. Exemplary factors for correcting the actual first drive speed and the actual second drive speed are shown in Table 2.

TABLE 1

| Steering Encoder (%) | Factor |
|---|---|
| 0 | 0.95 |
| 10 | 0.96 |
| 20 | 0.97 |
| 30 | 0.98 |
| 40 | 0.99 |
| 50 | 1.0 |
| 60 | 0.99 |
| 70 | 0.98 |
| 80 | 0.97 |
| 90 | 0.96 |
| 100 | 0.95 |

TABLE 2

| Steering Encoder (%) | Factor 1 for first wheel drive | Factor 2 for second wheel drive |
|---|---|---|
| 0 | 1.0 | 1.0 |
| 10 | 0.966 | 1.044 |
| 20 | 0.900 | 1.050 |
| 30 | 0.820 | 1.040 |
| 40 | 0.722 | 1.001 |
| 50 | 0.642 | 0.963 |
| 60 | 1.044 | 0.966 |
| 70 | 1.05 | −0.900 |
| 80 | 1.040 | 0.820 |
| 90 | 1.001 | 0.722 |
| 100 | 0.963 | 0.642 |

At activity 2850, at least one expected drive speed and at least one actual drive speed can be compared. Comparing at least one expected drive speed with the at least one actual drive speed can provide information indicative of whether a wheel drive is slipping and/or sliding on a surface. A speed deviation metric can be obtained via comparing at least one expected drive speed at least one actual drive speed. The speed deviation metric can be information indicative of whether a wheel drive is slipping and/or sliding on a surface. The speed deviation metric can provide information adaptable for use in improving the control, reliability, and/or safety of a vehicle.

At activity 2900, at least one drive speed can be controlled the speed controlled can be the first drive speed and/or the second drive speed. At least one drive speed can be controlled via a frequency controller associated with the first electric motor and/or the second electric motor. In certain exemplary embodiments, at least one drive speed can be controlled to prevent the first drive from rotating in a direction counter to the direction of the second drive. Preventing the first drive from rotating in a direction counter to the direction of the second drive can improve the life of mechanical power transmission equipment comprised in the first drive and/or the second drive such as, for example, a differential.

At activity 2950, the torque applied to at least one drive can be controlled. In certain exemplary embodiments, the torque applied to at least one drive can be controlled via controlling a torque output of the first electric motor and/or the second electric motor. Controlling the torque applied to at least one drive can improve the control of the vehicle when the vehicle is slipping and/or sliding. In certain exemplary embodiments, controlling the torque applied to at least one drive speed can prevent the first drive from rotating in a direction counter to the direction of the second drive.

Figure 3:
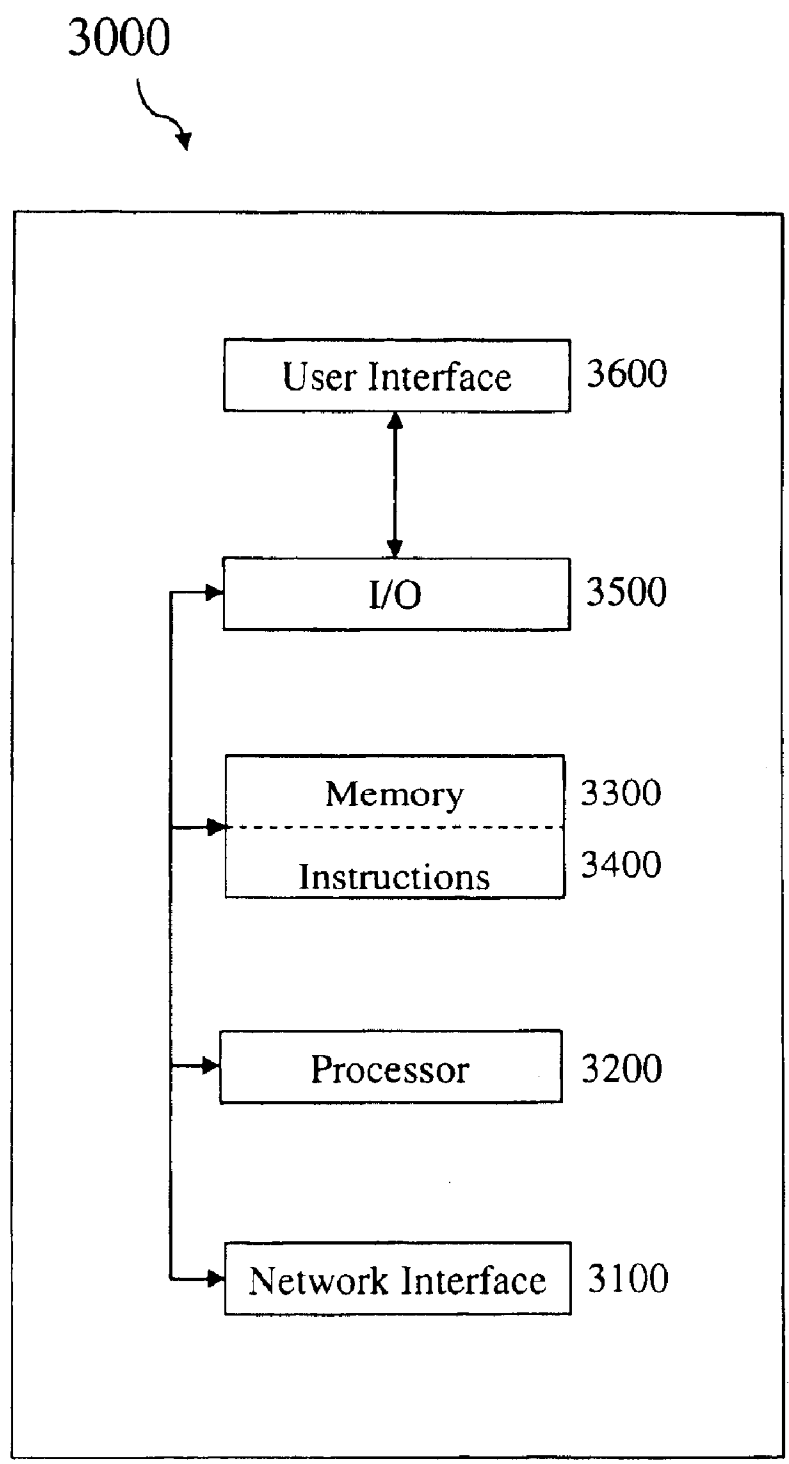
FIG. 3 is a block diagram of an exemplary embodiment of an information device 3000.

FIG. 3 is a block diagram of an exemplary embodiment of an information device 3000, which in certain operative embodiments can comprise, for example, comparator 1500, comparator 1700, controller 1600, controller 1800 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can provide a telecommunications address of a user-associated telecommunications device of interest and/or can receive current location information concerning the user-associated telecommunications device of interest.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A system comprising:

a velocimeter adapted to provide a measurement of an actual speed of a vehicle, the measurement utilizing Doppler Effect, the vehicle comprising a first wheel drive comprising a first motor, the first wheel drive controllably rotatable at a first drive speed, the vehicle comprising a second wheel drive comprising a second motor distinct from the first motor, the second wheel drive controllably rotatable at a second drive speed distinct from the first drive speed;

a first comparator adapted to compare an expected first drive speed, the expected first drive speed determined from the measurement of the actual speed of the vehicle, with a value related to an actual first drive speed; and a first controller adapted to control the first drive speed within a limited range, the limited range at least partially based upon information received from said first comparator.

2. The system of claim 1, further comprising:

a tachometer adapted to provide the value related to the actual first drive speed.

3. The system of claim 1, further comprising:

a steering encoder adapted to provide a value indicative of vehicular turn sharpness for correcting the measurement of the actual speed of the vehicle.

4. The system of claim 1, further comprising:

a steering encoder adapted to provide a value indicative of vehicular turn sharpness for correcting the expected first drive speed.

5. The system of claim 1, further comprising:

a second comparator adapted to compare an expected second drive speed, the expected second drive speed determined from the measurement of the actual speed of the vehicle, with a value related to an actual second drive speed; and a second controller adapted to control the second drive speed within a limited range, the limited range at least partially based upon information received from said second comparator.

6. The system of claim 1, further comprising:

the vehicle.

7. The system of claim 1, wherein said first controller is adapted to prevent the first wheel drive from reversing directions when a first wheel slips.

8. A method comprising:

receiving a measurement of a vehicle speed, the measurement utilizing Doppler Effect, the vehicle comprising a first wheel drive comprising a first electric motor, the first wheel drive controllably rotatable at a first drive speed, the vehicle comprising a second wheel drive comprising a second electric motor distinct from the first electric motor, the second wheel drive controllably rotatable at a second drive speed distinct from the first drive speed;

receiving information indicative of the first drive speed;

comparing a value related to the measurement of the vehicle speed with the information indicative of the first drive speed to obtain a first speed deviation metric; and controlling a torque output of the first electric motor within a limited range, the limited range at least partially based upon the first speed deviation metric.

9. The method of claim 8, further comprising:

determining the measurement of the vehicle speed via Doppler effect.

10. The method of claim 8, further comprising:

determining information indicative of the first drive speed.

11. The method of claim 8, further comprising:

determining information indicative of a second drive speed.

12. The method of claim 8, further comprising:

receiving information indicative of a second drive-speed;

comparing a value related to the measurement of the vehicle speed with the information indicative of the second drive speed to obtain a second speed deviation metric; and controlling a torque output of the second electric motor within a limited range responsive to the second speed deviation metric.

13. The method of claim 8, further comprising:

detecting a vehicular turn sharpness.

14. The method of claim 8, further comprising:

determining a value related to a vehicular turn sharpness.

15. The method of claim 8, further comprising:

correcting the measurement of the vehicle speed using a value related to a vehicular turn sharpness.

16. The method of claim 8, further comprising:

correcting the value related to the measurement of the vehicle speed responsive to a value related to a vehicular turn sharpness.

17. The method of claim 8, further comprising:

limiting a rotational speed of the first wheel drive within a limited range at least partially related to the measurement of the vehicle speed.

18. The method of claim 8, further comprising:

limiting a rotational direction of the first wheel drive responsive to the first speed deviation metric.

19. The method of claim 8, further comprising:

controlling the first electric motor speed responsive to the vehicle speed.

20. The method of claim 8, wherein the vehicle is a truck.

21. The method of claim 8, wherein the vehicle is a mine haul truck.

22. The method of claim 8, wherein said controlling adjusts the first wheel drive speed to a level between about 60 percent and about 100 percent of a value related to the measurement of the actual speed of the vehicle.

23. A machine-readable medium comprising stored instructions for:

receiving a measurement of a vehicle speed, the measurement utilizing Doppler Effect, the vehicle comprising a first wheel drive comprising a first electric motor, the first wheel drive controllably rotatable at a first drive speed, the vehicle comprising a second wheel drive comprising a second electric motor distinct from the first electric motor, the second wheel drive controllably rotatable at a second drive speed distinct from the first drive speed;

receiving information indicative of the first drive speed;

comparing a value related to the measurement of the vehicle speed with the information indicative of the first drive speed to obtain a first speed deviation metric; and controlling a torque output of the first electric motor within a limited range, the limited range at least partially based upon the first speed deviation metric.

* * * * *